(12) United States Patent
Kang et al.

(10) Patent No.: US 8,211,018 B2
(45) Date of Patent: Jul. 3, 2012

(54) TIME MULTIPLEXED METHOD AND DEVICE FOR BEAMFORMING

(75) Inventors: Xiaogang Kang, Shenzhen (CN); Zhiyong Guan, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1128 days.

(21) Appl. No.: 11/872,584

(22) Filed: Oct. 15, 2007

(65) Prior Publication Data

US 2008/0137482 A1  Jun. 12, 2008

(30) Foreign Application Priority Data

Dec. 7, 2006 (CN) .......................... 2006 1 0168851

(51) Int. Cl.
*A61B 8/00* (2006.01)
(52) U.S. Cl. ........ 600/441; 600/407; 600/437; 600/448; 600/443; 600/440
(58) Field of Classification Search .................. 600/407, 600/437–448
See application file for complete search history.

(56) References Cited

U.S. PATENT DOCUMENTS

| 5,253,073 | A | 10/1993 | Crowley |
| 5,313,508 | A | 5/1994 | Ditman et al. |
| 5,469,851 | A | 11/1995 | Lipschutz |
| 5,903,549 | A | 5/1999 | Von der Embse et al. |
| 6,491,634 | B1 * | 12/2002 | Leavitt et al. .................. 600/447 |
| 6,695,783 | B2 * | 2/2004 | Henderson et al. ........... 600/443 |

FOREIGN PATENT DOCUMENTS

| CN | 1650189 | 8/2005 |
| CN | 1870481 | 11/2006 |

\* cited by examiner

*Primary Examiner* — Brian Casler
*Assistant Examiner* — Joel Lamprecht
(74) *Attorney, Agent, or Firm* — Kory D. Christensen; Stoel Rives LLP

(57) ABSTRACT

The present invention relates to a digital beamformer in ultrasound imaging after the process of receiving a digital echo signal. Provided herein is a time multiplexed device and method for beamforming. The device includes an echo data write/read unit, a multi-beam processing unit, a channel data summing unit, and a parameter distributing and synchronizing unit for distributing and synchronizing respective receive parameters to the echo data write/read unit and the multi-beam processing unit through a parameter load bus for each of the beams in the channel.

18 Claims, 11 Drawing Sheets

| frequency | focus | density | line number | depth |
|---|---|---|---|---|
| frequency 0 | focus 0 | density 0 | line 0 | depth 0 parameter space |
| | | | | depth 1 parameter space |
| | | | | ... |
| | | | | depth K parameter space |
| | | | line 1 | ... |
| | | | ... | ... |
| | | | line L | ... |
| | | ... | | ... |
| | | density 3 | line 0 | depth 0 parameter space |
| | | | | depth 1 parameter space |
| | | | | ... |
| | | | | depth K parameter space |
| | | | line 1 | ... |
| | | | ... | ... |
| | | | line L | ... |
| | ... | | | ... |
| | focus M | density 0 | line 0 | depth 0 parameter space |
| | | | | depth 1 parameter space |
| | | | | ... |
| | | | | depth K parameter space |
| | | | line 1 | ... |
| | | | ... | ... |
| | | | line L | ... |
| | | ... | | ... |
| | | density 3 | line 0 | depth 0 parameter space |
| | | | | depth 1 parameter space |
| | | | | ... |
| | | | | depth K parameter space |
| | | | line 1 | ... |
| | | | ... | ... |
| | | | line L | ... |
| ... | | | | ... |
| frequency N | | | | |

Fig. 10

| focus 0 | density 0 | line 0 | 64 channel delay parameter |
| | | line 1 | 64 channel delay parameter |
| | | ... | ... |
| | | line L | 64 channel delay parameter |
| | ... | ... | |
| | density 3 | line 0 | 64 channel delay parameter |
| | | line 1 | 64 channel delay parameter |
| | | ... | ... |
| | | line L | 64 channel delay parameter |
| ... | ... | | |
| focus M | density 0 | line 0 | 64 channel delay parameter |
| | | line 1 | 64 channel delay parameter |
| | | ... | ... |
| | | line L | 64 channel delay parameter |
| | ... | ... | |
| | density 3 | line 0 | 64 channel delay parameter |
| | | line 1 | 64 channel delay parameter |
| | | ... | ... |
| | | line L | 64 channel delay parameter |

Fig. 11

| | | | depth 0 parameter space |
| --- | --- | --- | --- |
| focus 0 | density 0 | line 0 | depth 1 parameter space |
| | | | ... |
| | | line 1 | ... |
| | | ... | ... |
| | | line L | ... |
| | ... | ... | |
| | density 3 | line 0 | depth 0 parameter space |
| | | | depth 1 parameter space |
| | | | ... |
| | | line 1 | ... |
| | | ... | ... |
| | | line L | ... |
| ... | ... | | |
| focus M | density 0 | line 0 | depth 0 parameter space |
| | | | depth 1 parameter space |
| | | | ... |
| | | | depth K parameter space |
| | | line 1 | ... |
| | | ... | |
| | | line L | ... |
| | ... | ... | |
| | density 3 | line 0 | depth 0 parameter space |
| | | | depth 1 parameter space |
| | | | ... |
| | | | depth K parameter space |
| | | line 1 | ... |
| | | ... | |
| | | line L | ... |

Fig. 12

| | | | | depth 0 parameter space |
| --- | --- | --- | --- | --- |
| frequency 0 | focus 0 | density 0 | line 0 | depth 1 parameter space |
| | | | | ... |
| | | | | depth K parameter space |
| ... | ... | | | |
| frequency N | | | | |

Fig. 13

TIME MULTIPLEXED METHOD AND DEVICE FOR BEAMFORMING

STATEMENT OF RELATED APPLICATION

The present application claims the benefit of priority to the Chinese Patent Application No. 200610168851.2, entitled "Time Multiplexed Method and Device for Beamforming", filed on Dec. 7, 2006, which is incorporated herein by reference in its entirety.

FIELD OF THE INVENTION

The present invention relates to ultrasound imaging in an ultrasound diagnostic system, in particular, to a digital beam formation after the process of receiving digital echo signals.

BACKGROUND OF THE INVENTION

In an ultrasound imaging system, an ultrasound transducer is composed of a group of transducer elements. An ultrasound imaging process is required to transmit an ultrasound wave and receive echoes of the ultrasound wave, and each of the transducer elements in the ultrasound imaging system is connected to a transmitter and a receiver. Generally, to save cost, multiple receivers will share one echo processing unit.

During imaging, each transmitter transmits a delayed ultrasound pulse via the transducer element into which it is connected. When each of the transducer elements in the ultrasound transducer transmits well-defined delayed ultrasound pulse respectively and simultaneously, the transmitted ultrasound pulse energy can be focused in the desired position and direction. These transmitted ultrasound pulses will be reflected by the detected tissue. The transmitted ultrasound pulse is received by the receiver. The time for various transducer elements to receive the ultrasound pulse even reflected from the same position varies from one to another. The echoes received by these different transducer elements are amplified, delayed and then summed to form a focused received beams.

A medical ultrasound system forms two-dimensional images by means of the received beams (or referred to as scan line), each being referred to as a frame of image. The total number of the frames of the images generated per second is referred to as the frame rate, which is an important parameter. A high frame rate is the basic condition for truly reproducing a fast moving tissue. The frame rate may be improved by reducing the scan density, but it is achieved at the expense of the image spatial resolution. Alternatively, a high frame rate may be obtained by means of multi-beam, which means that multiple receive lines are generated in a single transmission.

U.S. Pat. No. 5,469,851, entitled "Time Multiplexed Digital Ultrasound Beamformer", discloses a digital ultrasound beamformer, which is capable of forming two or more beams simultaneously by means of time multiplexing. According to the technical solutions, the coefficient generator provides delayed data to the delay circuit multiplexed in each processing channel, and in the formation process, the apodization parameters of each channel are loaded with apodization parameter RAM. However, the invention concerned is not related to dynamic apodization, fast focus-changing imaging and fast frequency-changing imaging.

SUMMARY OF THE INVENTION

To overcome these disadvantages in existing technologies, the present invention provides a time multiplexed device and method for beamforming.

According to embodiments of the present invention, there is provided a time multiplexed device for beamforming, comprising: an echo data write/read unit for buffering each echo data that are converted from analog to digital in each channel, and reading the written echo data therefrom by means of time multiplexing based on the requirement of a beam data processing; a multi-beam processing unit for interpolating and apodization processing upon the beam data read from the echo data write/read unit in each channel, by means of time multiplexing; a channel data summing unit for summing, by means of time multiplexing, the data processed by the multi-beam processing unit, to lead to the final beam data. Said device may further include a parameter distributing and synchronizing unit for distributing and synchronizing respective receive parameters to the echo data write/read unit and the multi-beam processing unit through a parameter load bus for each of the beams in the channel.

Preferably, the above mentioned parameter distributing and synchronizing unit includes a parameter memory for storing various receive parameters relating to a probe, and a parameter controller for distributing and synchronizing respective receive parameters for each beam to the echo data write/read unit and the multi-beam processing unit. The parameter memory is a SDRAM; the receive parameters are delay parameters, dynamic focusing parameters, interpolation parameters or apodization parameters. These receive parameters are stored in the parameter memory in a multi-level storage structure, and the layers in the multi-level storage structure are selected from one or more of the group consisting of a frequency layer, a focus layer, a density layer, a line number layer and a depth layer.

Preferably, a parameter register connected to the parameter load bus in each channel has a two-level register structure, which includes a parameter address decoding module for decoding the address bus of the parameter load bus to generate a decoded output signal, a level 1 parameter register for storing data from the data bus of the parameter load bus using the decoded output signal as an enable signal; and a level 2 parameter register for providing, as an enable signal for the level 2 parameter register, a synchronous load signal corresponding to the delayed beam data through the parameter load bus. The synchronous load signal is produced by the parameter load bus when the delayed beam data is the last data of a dynamic focusing zone.

According to embodiments of the present invention, there is provided a time multiplexed method for beamforming, comprising the steps of: writing and buffering each echo data that are converted from analog to digital in each channel, and reading the written echo data by means of time multiplexing based on the requirement of a beam data processing; processing the beam data read out from each channel such that the beam data are interpolated and apodized by means of time multiplexing; summing, by means of time multiplexing, the beam data having been processed to lead to the final beam data; writing/reading the echo data and processing the beam data comprise distributing and synchronizing respective receive parameters of the corresponding focusing zone for each beam in each channel by means of the parameter load bus.

Preferably, the distributing and synchronizing step comprises storing the receive parameters in an external parameter memory; reading out the receive parameters of the corresponding focusing zone in each parameter load cycle during beamforming; and loading the parameter to realize the distribution and synchronization of the respective receive parameters for each beam. Wherein, the parameter loading step comprises: decoding the address bus of the parameter load bus to generate an enable signal for storing; storing in a first parameter register the data from the data bus of the parameter load bus according to the enable signal; and updating, when a synchronous load signal is valid, the stored data to a second parameter register for used by a corresponding unit. The synchronous load signal is produced by the parameter load bus when the delayed beam data is the last data of a dynamic focusing zone, and the receive parameters are delay parameters, dynamic focusing parameters, interpolation parameters or apodization parameters. Wherein, the above mentioned receive parameters are stored in the parameter memory in a multi-level storage structure, and the layers in the multi-level storage structure are selected from one or more of the group comprising a frequency layer, a focus layer, a density layer, a line number layer and a depth layer.

The device and method according to the present invention supports a multi-beam formation, dynamic focusing, dynamic apodization and fast focus-changing imaging and fast frequency-changing imaging.

BRIEF DESCRIPTION OF THE DRAWINGS

FIG. 10 shows a structure for storing receive parameters;

FIG. 11 shows a structure for storing delay parameters;

FIG. 12 shows a structure for storing dynamic focusing parameters and apodization parameters;

FIG. 13 shows a structure for storing interpolation parameters;

DETAILED DESCRIPTION OF THE INVENTION

The present invention will be described hereunder in greater details with reference to the accompanying drawings, in which embodiments of the invention are shown. However, it should be understood that the present invention may be embodied in many different forms and should not be construed as limited to the embodiments set forth herein. In contrast, these embodiments are provided for the thorough and full understanding of the present invention.

Figure 1:
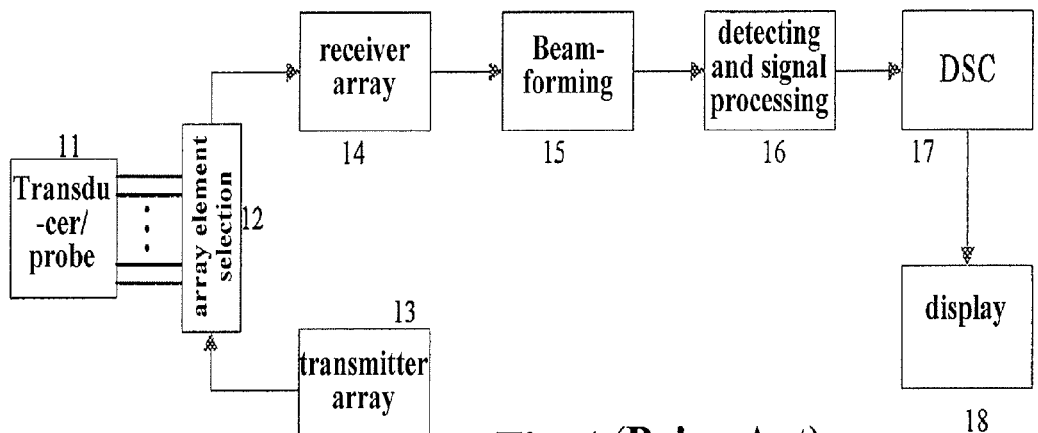
FIG. 1 shows a typical type B ultrasound imaging system.

A typical ultrasound imaging system is shown in FIG. 1, which comprises an ultrasound transducer/probe 11, array element selection module 12, transmitter array 13, receiver array 14, beamformer 15, detecting and signal processing module 16, digital scan converter DSC module 17, and display 18. The beamformer 15 is composed of a group of channel processing units. Each channel processing unit corresponds to one or more transducer unit, dependent on the number of the ultrasound imaging system transducer units and the number of the channel processing units. In a system with 128 transducer units/64 processing channel units, for example, one channel processing unit of the beamformer corresponds to two transducer units, whereas in a system with 128 transducer units/128 processing channel units, one channel processing unit of the beamformer corresponds to one transducer unit.

Figure 2:
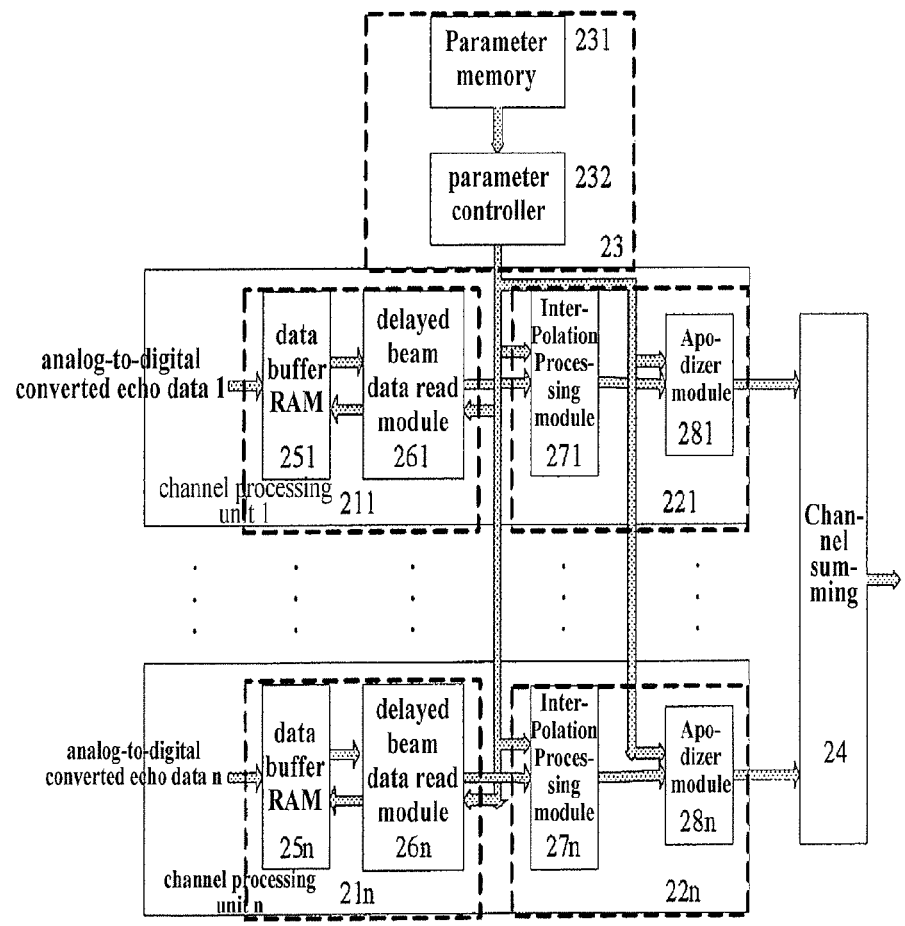
FIG. 2 is a block diagram of a beamformer according to an embodiment of the present invention.

The beamforming device and method according to the present invention will be illustrated hereunder, taking a dual-beam formation as an example. Obviously, said device and method are also applicable to the formation of a different number of beams. FIG. 2 is a block diagram of a dual-beam beamformer according to an embodiment of the present invention. The beamformer includes echo data write/read units 211~21n and multi-beam processing units 221~22n corresponding to n channel processing units, a parameter distributing and synchronizing unit 23 and a channel data summing unit 24. The receiver array 14 inputs the received analog echo signal 1~n into corresponding analog-to-digital converting units, where the analog echo signals are converted into digital echo data 1n, and then these converted signals 1~n are input into respective echo data write/read units 211~21n. The echo data write/read units 211~21n include data buffer RAMs 251~25n and delayed beam data read modules 261~26n. The converted digital echo signals are written into respective data buffer RAMs 251~25n during reception. Said data buffer RAMs 251~25n are generally a dual port RAM.

The received ultrasound pulse echoes are analog-to-digital converted at a certain sampling frequency f, and the resulting digital echoes are written into a dual port RAM in series. The write address begins at 0, and is incremented by 1 every sampling clock. When the maximum address is reached, the write address returns to 0, and is incremented consecutively. Assume there are totaling g beams to be processed at the RAM port, the data is read at a frequency g*f, and the echo as read is an echo that is delayed. While forming the beams, the channel processing units 1~n perform simultaneously a dual-beam processing on the echo data read from corresponding data buffer RAMs.

Figure 3:
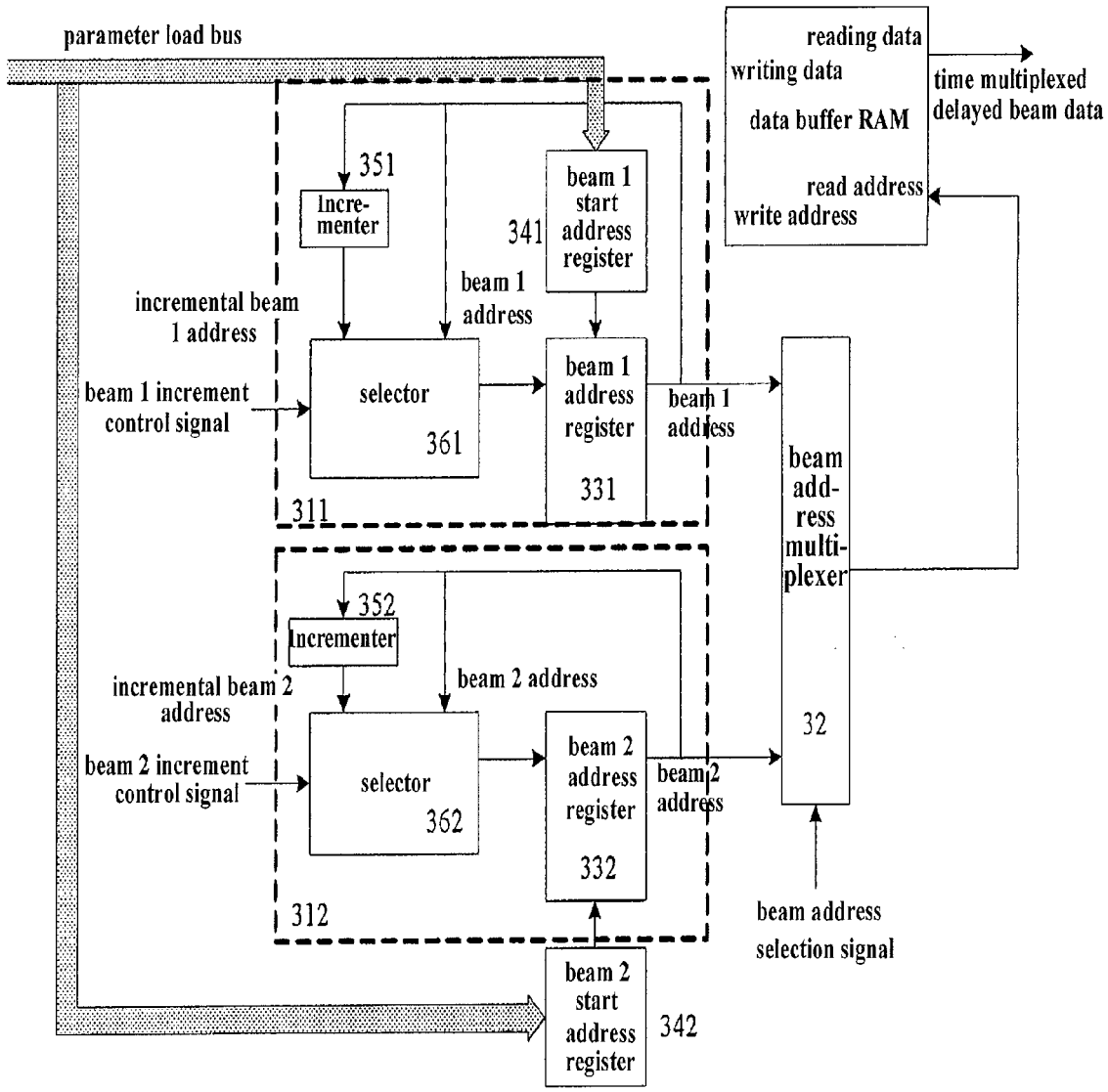
FIG. 3 shows a block diagram of a delayed beam data read module in the beamformer according to an embodiment of the present invention.

FIG. 3 shows a delayed beam data read module, comprising beam address generation means 311~312 for generating a read address of each beam, and a beam address multiplexer 32 for time-multiplexing inputting the read address of each beam into a read address input port of said data buffer RAM. The beam address generating means 311~312 include beam address registers 331~322, beam start address registers 341~342, incrementers 351~352 for generating respective incremental beam addresses and selectors 361~362.

The read module generates read addressees of two beams using the delay parameters of the corresponding beams as an initial value, and the read clock of the data buffer RAM is twice of the analog-to-digital conversion clock. The read addresses of these two beams are time-multiplexing input into the read address input port of the data buffer RAM during the beamforming. Specifically, in the first read clock period, the read address of beam 1 is input, the read address of beam 2 in the second read clock period, and the read address of beam 1 in the third read clock period . . . . The read addresses of beam 1 and beam 2 are controlled by increment control signals from corresponding start address and the beam address respectively. A parameter load bus loads delay parameters of each channel processing unit as an initial read address into the start address registers of beam 1 and beam 2, this start read address being representative of the delay value of the beam. When the address increment control signal of beam 1 has a high level, the corresponding selector selects the incremental beam 1 address and outputs it to the beam 1 address register as the read address of beam 1; if the address increment control signal of beam 1 has a low level, the corresponding selector selects and outputs the beam 1 address register value, where the beam 1 read address is not changed.

When the address increment control signal of beam 2 has a high level, the corresponding selector selects and outputs the incremental beam 2 address to the beam 2 address register as the read address of beam 2; if the address increment control signal of beam 2 has a low level, the corresponding selector selects and outputs the beam 2 address register value, where the beam 2 read address is not changed. The incrementer in the address generation circuit is an adder which increments by 1.

Figure 4:
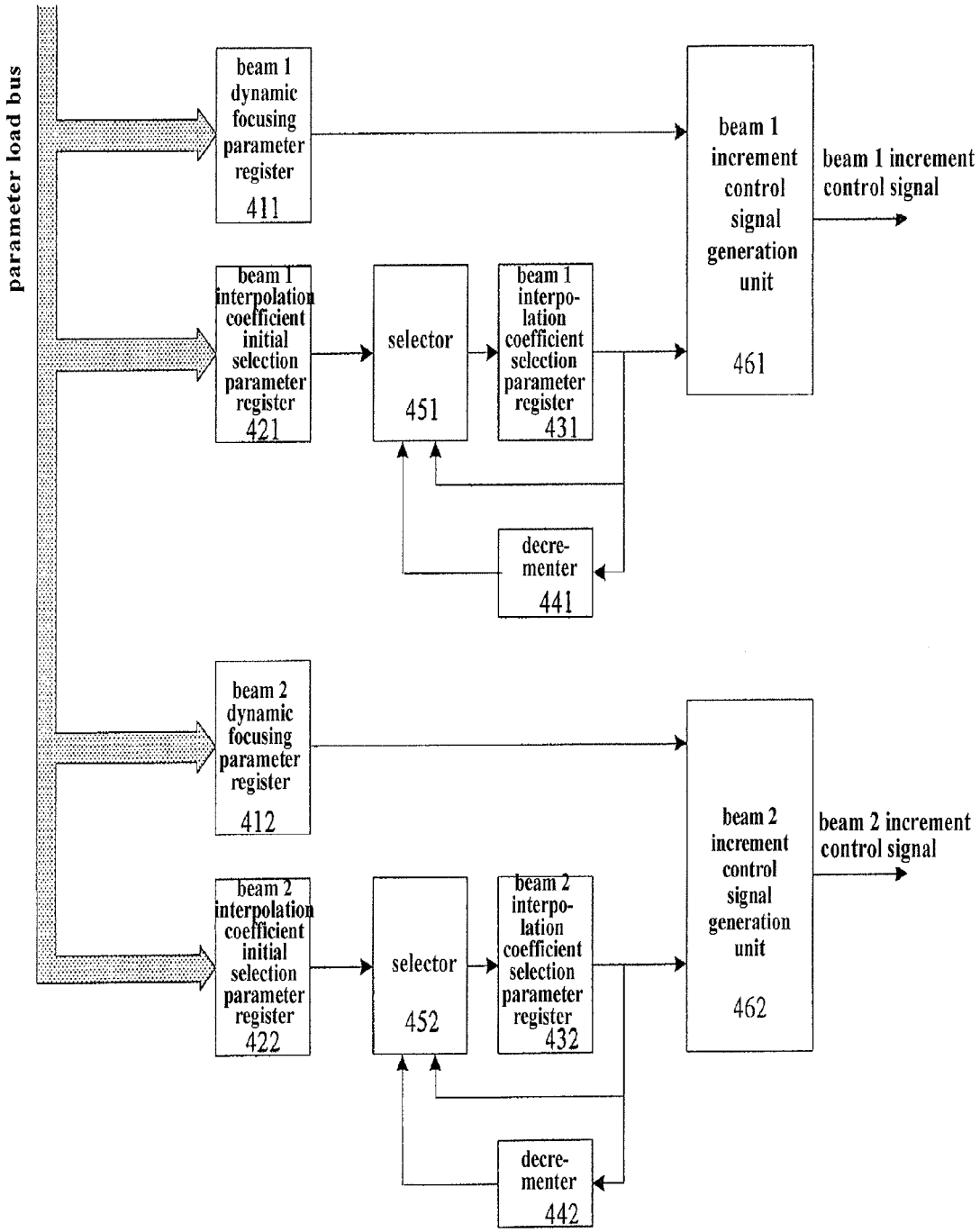
FIG. 4 is a circuit diagram of the generation of the increment control signal of FIG. 3.

The address increment control signal generation circuits of beam 1 and beam 2 are shown in FIG. 4, comprising beam dynamic focusing parameter registers 411~412, beam interpolation coefficient initial selection parameter registers 421~422, beam interpolation coefficient selection parameter register 431~432, decrementers 441~442, selectors 451~452, and increment control signal generation units 461~462.

The parameter load bus loads dynamic focusing parameters and interpolation coefficient initial selection parameters of beam 1 and beam 2. During the beamforming, firstly, the beam 1 and beam 2 interpolation coefficients are loaded into an interpolation coefficient selection parameter register through the selector. The selection coefficients each correspond to the first receiving focusing zone of the corresponding beam, and also correspond to the value of the dynamic focusing parameter register of the corresponding beam. The whole receiving area is partitioned into a number of receive focusing zones, for example, k zones (k=2048 in the system of the present invention). Each of the receive focusing zones corresponds to a dynamic focusing parameter. During the beamforming, when the receive focusing zone spans from n to n+1, if the dynamic focusing parameter of the corresponding beam is 1, the interpolation coefficient selection parameter of the corresponding beam is decreased by 1, and if the dynamic focusing parameter of the corresponding beam is 0, the interpolation coefficient selection parameter of the corresponding beam remains unchanged. This process is implemented in the decrementer, which is a subtractor which decrements by 1. In the system in question, there are four groups of interpolation coefficients, each being representative of ⅛ position, ⅜ position, ⅝ position and ⅞ position. The decrement process of the interpolation coefficient selection parameter during the whole beamforming is a continuous repetition of a ⅞->⅝ ->⅜ ->⅛->⅞ . . . . When the receive focusing zone spans from n to n+1, if the dynamic focusing parameter register of the corresponding beam as shown in FIG. 4 reads 1 and the interpolation coefficient selection parameter of the corresponding beam corresponds to the ⅛ position value, the increment control signal generation unit of the corresponding beam generates a high level signal of the one pulse width. In other cases, the increment control signal generation unit of the corresponding beam outputs a low level signal.

Figure 5:
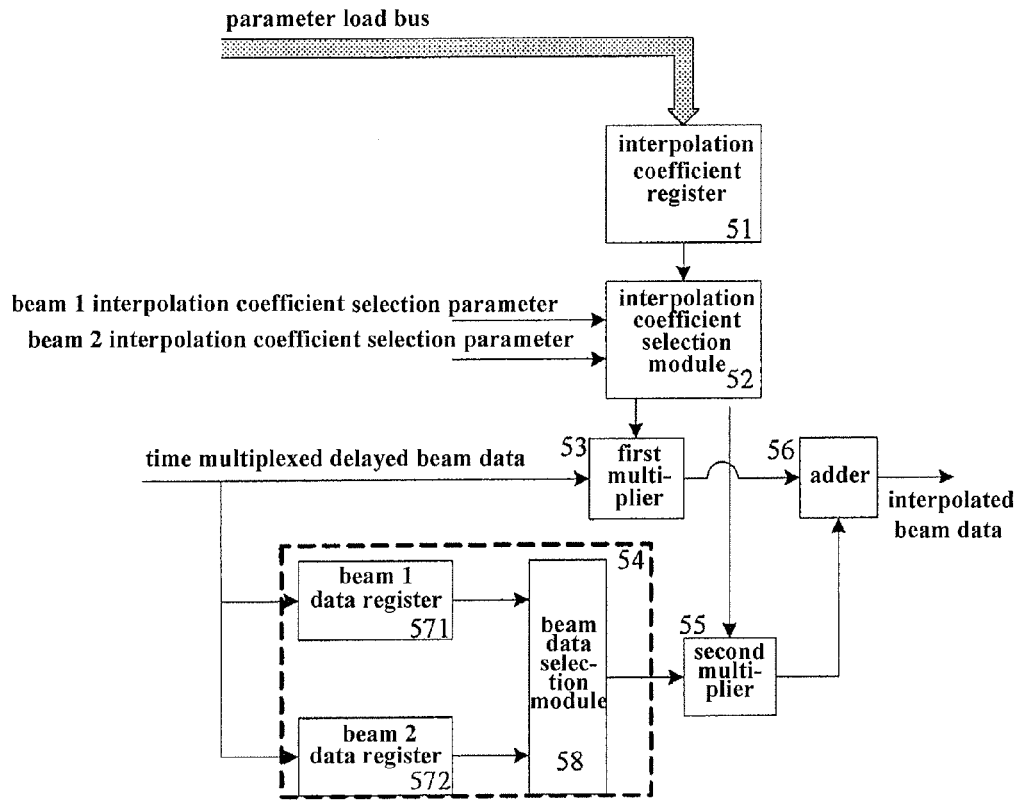
FIG. 5 is a block diagram of an interpolation processing module in the beamformer according to an embodiment of the present invention.
Figure 6:
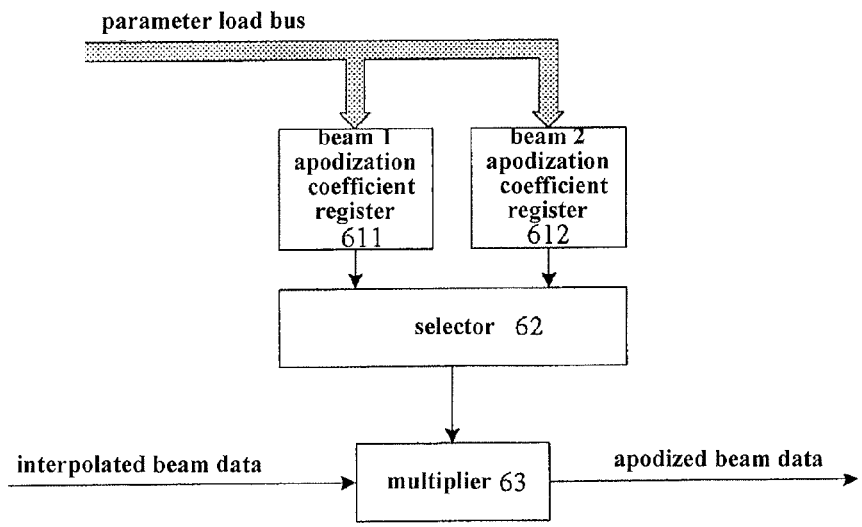
FIG. 6 is a block diagram of an apodization module in the beamformer according to an embodiment of the present invention.

FIGS. 5 and 6 show respectively block diagrams of the interpolation processing modules 271~27n and apodization modules 281~28n. The interpolation processing modules 271~27n include an interpolation coefficient register 51, an interpolation coefficient selection module 52, a first multiplier 53, beam data selection means 54, a second multiplier 55 and an adder 56. Wherein, the beam data selection means 55 includes beam data registers 571~572 and a beam data selection module 58. The apodization modules 281~28n include beam apodization parameter registers 611~612, a selector 62 and a multiplier 63.

The time multiplexing multi-beam processing mechanism includes an echo data time-multiplexed loading and a parameter time-multiplexed loading. When performing the multi-beam processing, the delayed beam data is read from RAM at a frequency of g*f, the first clock corresponding to the delayed data of beam 1, the second clock corresponding to the second beam data, . . . , the $n^{th}$ clock corresponding to the $n^{th}$ beam data, the $(n+1)^{th}$ clock corresponding to the first beam data, . . . and so on. The multiple beams share one circuitry in the channel processing unit. The parameters involved in the beamforming are varied with different positions of the echo data. During the forming of different beams, the parameters regarding the circuit are also loaded in time multiplexing.

The delayed beam data read from the data buffer RAM and the corresponding interpolation coefficient selection parameters are inputted into an interpolation processing module, which is shown in FIG. 5. During the whole beamforming, the parameter load bus loads the respective interpolation coefficients into the interpolation coefficient registers, in which the interpolation coefficients respectively corresponding to ⅛ position, ⅜ position, ⅝ position and ⅞ position are registered. Beam 1 and beam 2 share data input port time-multiplexed. The input beam data of beam 1 and beam 2 are separately stored in the beam 1 data register and the beam 2 data register. Beam 1 and beam 2 share the multiplier and the adder in the interpolation processing module for interpolation processing. Based on the input beam 1 interpolation coefficient selection parameter and beam 2 interpolation coefficient selection parameter, which correspond to the beam data, it is to select interpolation coefficients for interpolation operations regarding beams 1 and 2. During the interpolation operation, if what is inputted at the current clock is the data of beam 1, said data is simultaneously inputted into the corresponding multiplier and registered in the beam 1 data register. In the mean time, the beam data originally registered in the beam 1 data register is output to the corresponding multiplier via the selector. Corresponding to the data input into the multiplier, related interpolation coefficients are selected based on the beam 1 interpolation coefficient selection parameter and inputted into two multipliers respectively. The results of the multipliers are inputted into the adder for summing, leading to the interpolation processing result of the beam data. The data regarding beam 2 is inputted at the next clock. The data is simultaneously inputted into the corresponding multiplexed multiplier and registered in the beam 2 data register. In the mean time, the beam data originally registered in the beam 2 data register is outputted to the corresponding multiplier via the selector. Corresponding to the beam 2 data input into the multiplier, corresponding interpolation coefficients are selected based on the beam 2 interpolation coefficient selection parameter and inputted into two multipliers respectively. The results of the multipliers are inputted into the adder for summing, leading to the interpolation processing result of the beam 2 data. The data regarding beam 1 and beam 2 are alternately inputted into the interpolation processing module as above mentioned till the completion of the dual-beam interpolation processing of the whole receiving process.

Upon interpolation processing, the dual-beam data is inputted into an apodization module, which is shown in FIG. 6. During the whole beam formation, the parameter load bus loads corresponding apodization parameters into the beam 1 apodization coefficient register and the beam 2 apodization coefficient register. The data of beam 1 and beam 2 use, by means of time multiplexing, the beam data bus after being interpolated, and use, by means of time multiplexing, the beam data bus after being apodized, to output the apodization processing result. If it is an interpolated beam data of beam 1 that is inputted at the current clock during the apodization processing, the beam 1 apodization coefficient is inputted into the multiplier via the selector while inputting the data into the multiplier. The result of multiplication is outputted via the apodized beam data bus. Data of the beam 2 after being interpolated is inputted at the next clock, the beam 2 apodization coefficient is inputted into the multiplier via the selector while inputting the data into the multiplier. The result of multiplication is outputted by means of time multiplexing of the apodization beam data bus.

The whole beam formation is partitioned into 2048 receive focusing zones, each corresponding to an apodization value. As the receive focusing zone changes between 0-2047, the apodization value changes accordingly, thus fulfilling a dynamic apodization.

The channel data summing mechanism is a time multiplexing pipelining structure, whereby the delayed beam data processed by each channel processing unit are summed up in a pipelining manner to lead to the final beam data. In the multibeam formation, the pipelined summing of beam data is performed in time multiplexing. In the beamformer as shown in FIG. 2, the number of the channel processing units n equals to 64, and these 64 channel processing units have an identical structure, but correspond to different parameters during the beamforming. The processing results of said 64 channel processing units are inputted into a channel summing module which is a time multiplexing summing module to complete the summing of the dual-beam. For example, at the current clock, 64 channel processing units simultaneously output the apodization processing results of 64 beams 1. The apodization processing results of these 64 beams 1 are summed, and then outputted after being k-stage pipelined. At the next clock, 64 channel processing units simultaneously output the apodization processing results of 64 beams 2. The apodization processing results of these 64 beams 2 are summed, and then outputted after being k-stage pipelined, . . . , and so on, so as to complete the summing of beam 1 and beam 2 in this beam formation period by means of time multiplexing.

Figure 7:
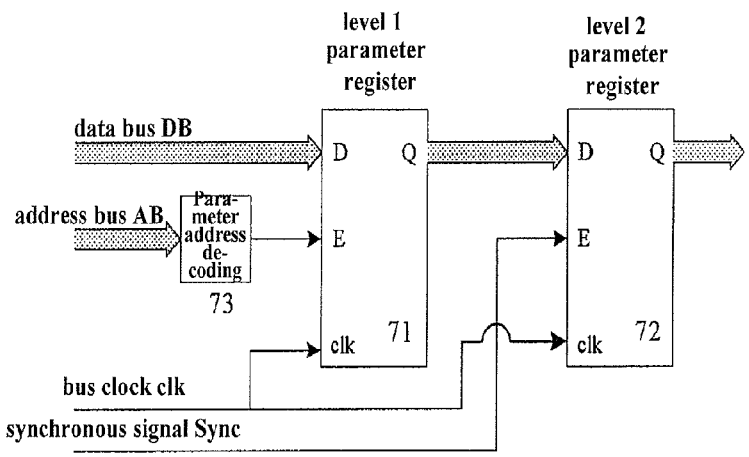
FIG. 7 is a structural diagram of the 2-level register module in the beamformer according to an embodiment of the present invention.

The parameter register in each channel processing unit connected to the parameter load bus is a sub-module of a two-stage register structure, as shown in FIG. 7. Each module in the channel processing unit decodes the address bus AB of the parameter load bus. If the decoding result is a corresponding parameter of the processing unit concerned, the parameter decoding module will generate an enable signal, which is inputted into an enable port E of a level 1 parameter register and causes the level 1 register to register the data from the data bus DB. The parameter load bus has a synchronous load signal corresponding to the delayed beam data, which signal is inputted into the enable port E of a level 2 register. When the delayed beam data is the last data of a dynamic focusing zone, the next beam data will correspond to the first data of a new dynamic focusing zone. At this time, the beam receive parameter corresponding to the delayed beam data should be updated to a parameter corresponding to a new dynamic focusing zone. In said changing process, the parameter load bus generates a synchronous load signal that is valid when a high pulse, such that the parameters in the new focusing zone will be forwarded from the level 1 parameter register to the level 2 parameter register right before use.

During the whole beamforming, the parameter controller performs a real time parameter distribution on the 64 channel processing units via the parameter load bus. The parameters to be loaded include delay parameters, dynamic focusing parameters, interpolation parameters and apodization parameters. These parameters are stored in an external memory. During the beamforming, the parameter controller read Corresponding parameters from the memory, which are then loaded into the 64 channel processing units via the parameter load bus.

Figure 8:
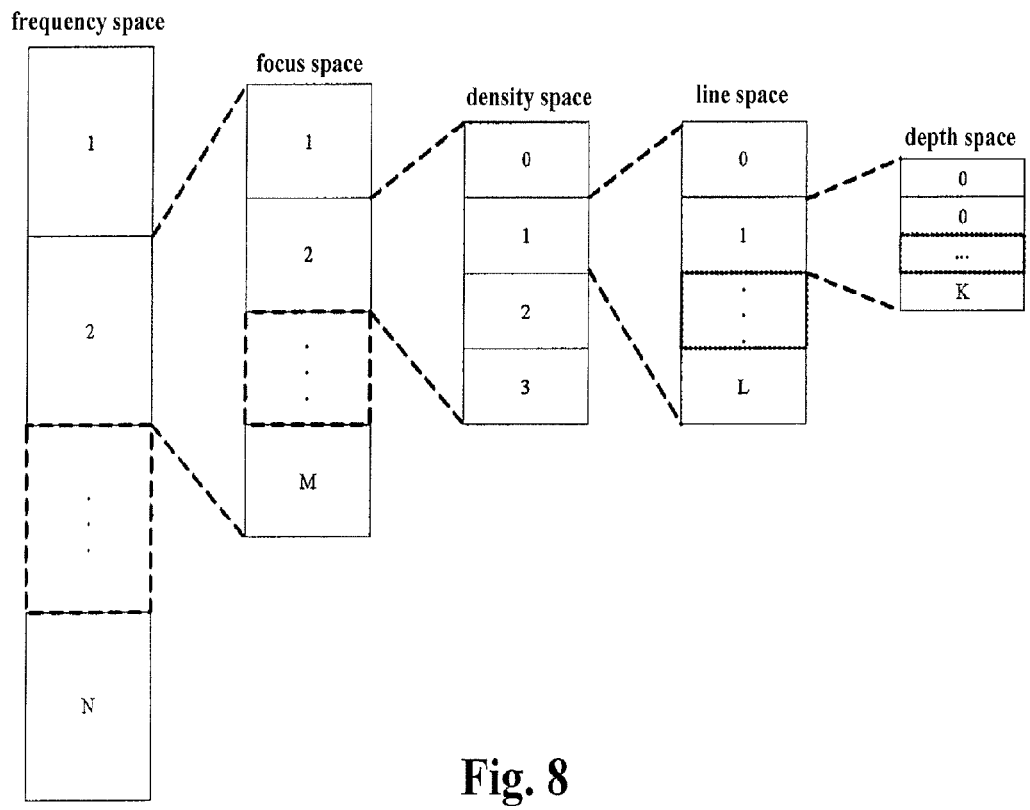
FIG. 8 shows a structural diagram of a regularized and partitioned parameter memory.
Figure 9:
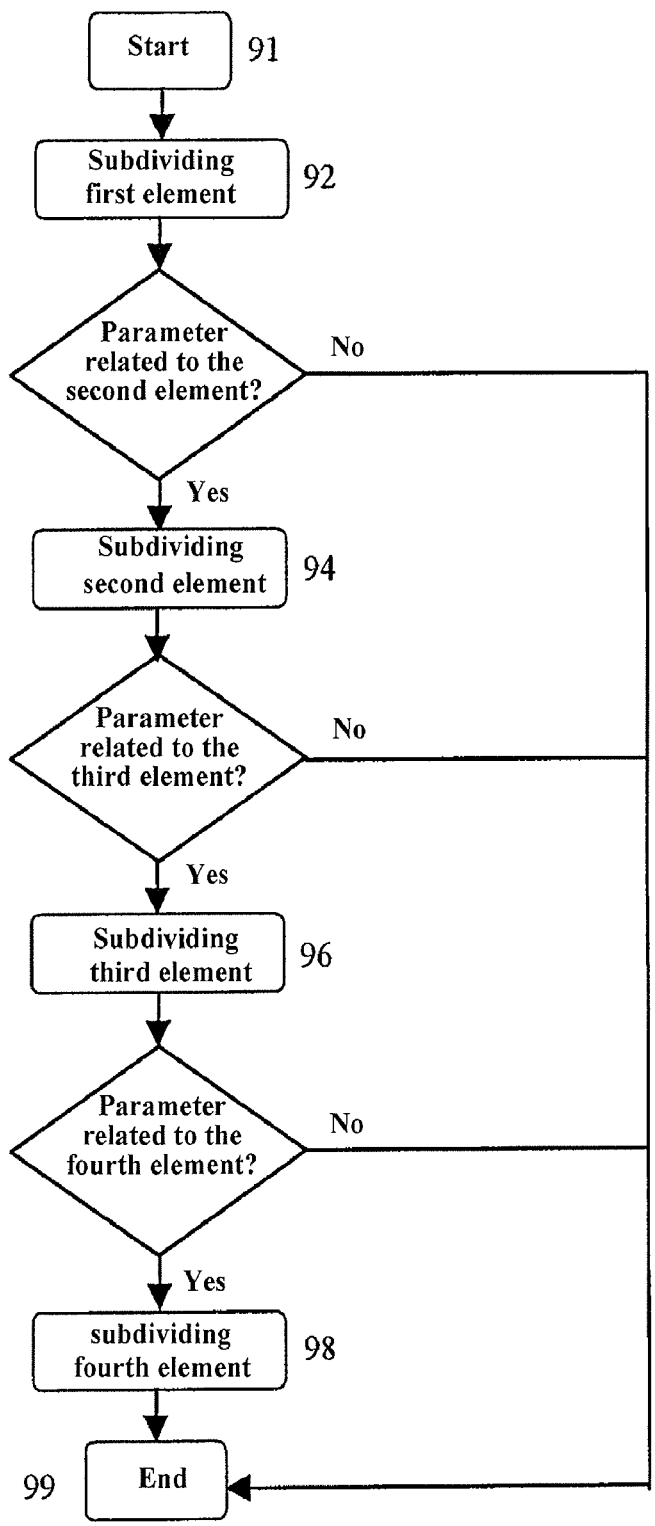
FIG. 9 shows a flowchart of data processing for the beamformer.

FIG. 9 shows a flowchart regarding a data processing method for beam formation, which supports fast frequency-changing and fast focus-changing imaging. As shown in FIG. 9, the first, second, third, fourth and fifth elements either correspond to frequency, focus, density, line number and depth, respectively, or correspond to any one of them randomly. Various parameters are stored in the external parameter memory in a way as shown in FIG. 8.

According to the flow as shown in FIG. 9, the data processing method begins with step 91, and at step 92, each of the first element is subdivided into one or more second elements. Then, at step 93, a determination is made whether the parameter is related to the second element. If so, it continues to step 94 where each of the second elements is subdivided into one or more third elements. If not, the flow ends at 99. Similarly, at step 95, a determination is made whether the parameter is related to the third element. If so, it continues to step 96 where each of the third elements is subdivided into one or more fourth elements. If not, the flow ends at 99. At step 97, a determination is made whether the parameter is related to the fourth element. If so, it continues to step 98 where each of the fourth elements is subdivided into one or more fifth elements. If not, the flow ends at 99.

According to the memory structure of FIG. 8 and the parameter processing flowchart of FIG. 9, assuming the system supports N types of frequency change, M transmitting focuses, a high/medium/low scan density, and L scan lines under high density, and assume each scan line has K dynamic focusing zones (depth space), respective parameters are regularizedly stored in the memory as shown in FIG. 10 dependent on different frequencies, transmitting focuses, densities, scan lines and different dynamic focusing zones. If some parameters are not related to frequency, density or focus, the memory structure may be optimized as required. For example, the delay parameter, which is not either related to frequency or related to the dynamic focusing zone, has one frequency (N=1) and one depth space (K=1) in the regularized storage structure, as shown in FIG. 11. The dynamic focusing parameter, not related to frequency, has one frequency (N=1) in the regularized storage structure, as shown in FIG. 12. The interpolation parameter is related to frequency only, and thus has one focus (M=1), defining only one density zone, and has one line (L=1), as shown in FIG. 13. The apodization parameter is not related to frequency, so the number of frequencies N=1, and the memory structure is shown in FIG. 12.

In the system according to the present invention, the number of frequencies N=16, the number of focuses M=8, the number of high density scan lines L=256, and the depth K=2048.

The delay parameter, the dynamic focusing parameter, the interpolation coefficient parameter and the apodization parameter are stored as above mentioned in the memory. The start position of each parameter in the memory is allocated a start address, which corresponds to the first address of the memory structure. The start addresses are allocated in a way that various parameter spaces are not overlapped so as to be mapped onto the external memory. The external memory is a SDRAM in the present invention.

When the ultrasound imaging system detects that the probe type used in the system is a convex array or linear array or phased array, the master controller downloads the delay parameter, dynamic focusing parameter, interpolation coefficient parameter and apodization parameter of the corresponding probe into the external memory. During imaging, the frequency-changing and the focus-changing operations are actually a process in which the parameter controller reads parameters at different locations in the external memory, thus implementing the fast frequency-changing and the fast focus-changing operations.

Figure 15:
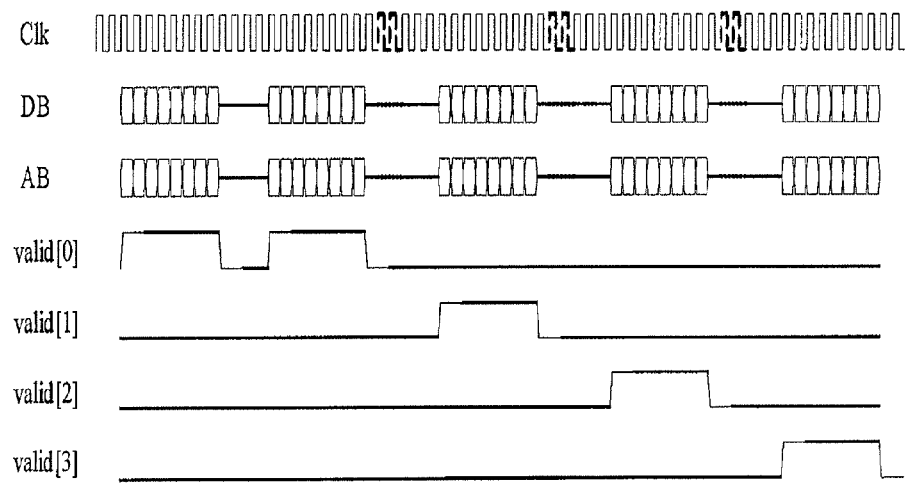
FIG. 15 shows a time sequencing for parameter loading in one load cycle.

The parameter load bus of the parameter controller module is composed of a parameter data bus DB, a parameter address bus AB and parameter control signals. The parameter control signals include a clock signal, a parameter synchronous signal sync and a parameter effective signal valid [3:0]. Each bit of the parameter effective signal corresponds to a class of parameters. Specifically, valid[0] corresponds to the delay parameter, valid[1] to the dynamic focusing parameter, valid [2] to the interpolation parameter, and valid[3] to the apodization parameter. In the present invention, a high valid[0] signifies an effective delay parameter, a high valid[1] signifies an effective dynamic focusing parameter; a high valid[2] signifies an effective interpolation parameter; and a high valid[3] signifies an effective apodization parameter. The parameter address bus AB is used to distinguish between the respective channel processing units of beam 1 and the respective channel processing units of beam 2. The ultrasound imaging system described in the present invention has 64 channel processing units and supports dual-beam processing, so the parameter address bus is of a 6-bit width, and the parameter data bus is 64 bits in width. FIG. 15 shows the timing for loading various parameters regarding one beam in one load cycle.

Figure 14:
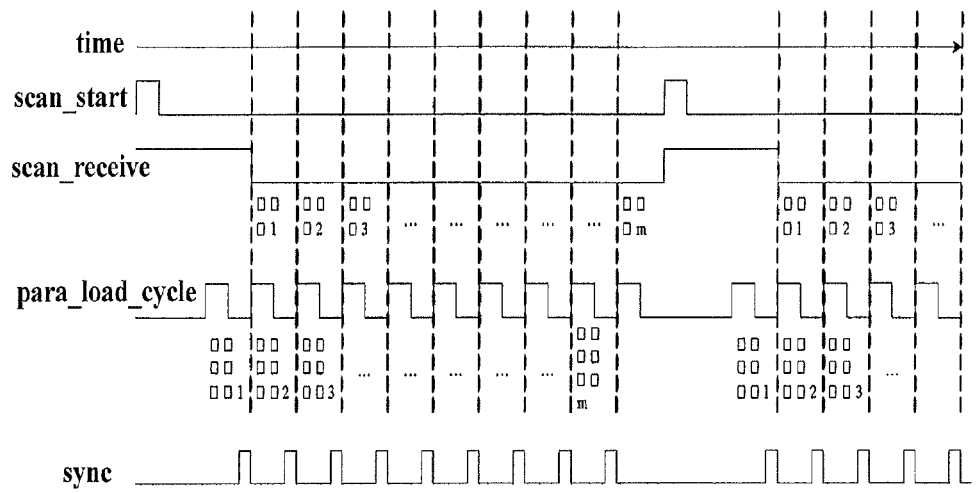
FIG. 14 shows a time sequence of parameter loading.

Each receive focusing zone corresponds to a parameter load cycle, the dynamic focusing bit, the interpolation coefficient and the apodization coefficient are loaded in each parameter load cycle, but the delay parameter is only loaded in the first load cycle. The timing for the parameter load cycle is shown in FIG. 14. Scan_start refers to the start of one transmitting-receiving; time represents a time axis. When scan_receive is low, it represents an echo receiving period and a beam formation period. The beam formation period is partitioned into focusing zone 1, focusing zone 2, . . . , focusing zone m based on the time span of the receive focusing zone. The ultrasound imaging system according to the present invention is defined as having a maximum focusing zone m=2048. The actual number of the focusing zones m is related to the probed depth. Para_load_cycle represents parameter load cycles, each parameter load cycle corresponding to a receive focusing zone. In the first parameter load cycle, the delay parameter, the dynamic focusing parameter, interpolation parameter and the apodization parameter are required to be loaded, while in other parameter load cycles, only the dynamic focusing parameter, interpolation parameter and the apodization parameter are required to be loaded. The parameters loaded in the first parameter load cycle correspond to the receive focusing zone 1, the parameters loaded in the second parameter load cycle correspond to the receive focusing zone 2, . . . .

The parameter synchronous signal sync is a high level effective signal of a single clock pulse width that is effective at a clock cycle before the beginning of each focusing zone, as shown in FIG. 14. The parameter synchronous signal sync is mainly useful for enabling the parameters loaded in the parameter load cycle n to be passed to the processing units for beamforming via the register structure of FIG. 7, and time aligned with the delayed beam data in the focusing zone n for the beamforming processing.

Figure 16:
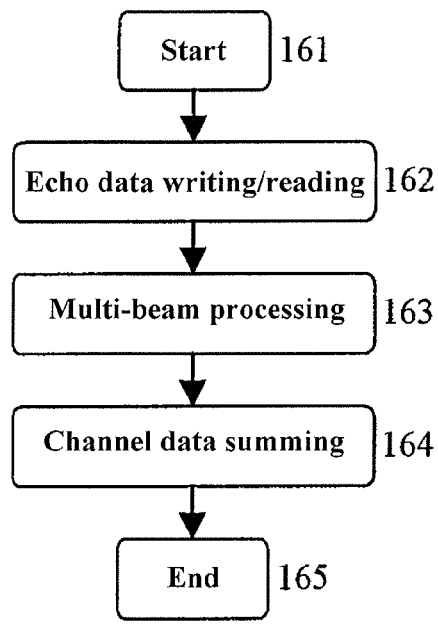
FIG. 16 is a diagram of the beamforming process.

According to embodiments of the present invention, there is provided a time multiplexed method for beamforming herein. Typically, the beamforming method includes the steps as shown in FIG. 16. Analog-to-digital converted digital echo data are written and buffered in each channel, and then read out by means of time multiplexing based on the requirement of a beam data processing at step 162. The beam data as read are subjected to multi-beam processing at step 163 such that the echo data are interpolated and apodized, by means of time multiplexing. At the subsequent step 164, the data having been multi-beam processed are summed up by means of time multiplexing to lead to the final beam data. During performing the echo data writing/reading and the multi-beam processing, the parameter load bus distributes and synchronizes respective receive parameters of the corresponding focusing zone for each of the beams in each channel. In other words, it is a process that the receive parameters are being transferred to an external parameter memory. Particularly, said receive parameters of the corresponding focusing zone are read in each parameter load cycle during beamforming, and distributed and synchronized for each beam.

Figure 17:
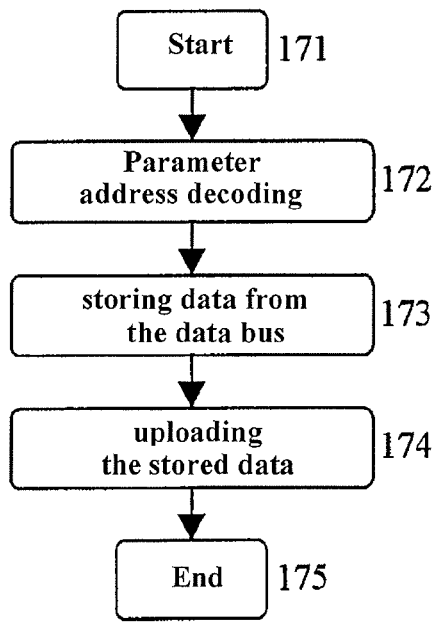
FIG. 17 is a diagram of a two-level parameter loading process.

FIG. 17 shows a two-stage parameter loading process. At step 172, the address bus of the parameter load bus is decoded to generate an enable signal for a first loading. Subsequently at step 173, the data from the data bus in the parameter load bus are stored in a first parameter register by means of said enable signal, and then at step 174 are updated to a second parameter register for the corresponding unit for use when the synchronous load signal is valid.

It is to be understood, however, that even though particular embodiments of the present invention have been set forth in the foregoing description, the disclosure is illustrative only. Those having ordinary skill in the art and access to the teachings of the invention provided herein will recognize additional modifications, applications, and embodiments within the scope thereof and additional fields in which the present invention would be of significant utility. It is intended by the appended claims to cover any and all such applications, modifications, and embodiments within the scope of the present invention.

The invention claimed is:

1. A time multiplexed device for beamforming, the device comprising:
    an echo data write/read unit for buffering each echo data that are converted from analog to digital in each channel, and reading the written echo data therefrom by means of time multiplexing based on the requirement of a beam data processing;
    a multi-beam processing unit for interpolating and apodization processing upon the beam data read from the echo data write/read unit in each channel, by means of time multiplexing, wherein the multi-beam processing unit comprises an interpolation processing module and an apodization module;
    a channel data summing unit for summing, by means of time multiplexing, the data processed by the multi-beam processing unit, to lead to the final beam data; and
    a parameter distributing and synchronizing unit for distributing and synchronizing respective receive parameters to the echo data write/read unit and the multi-beam processing unit through a parameter load bus for each of the beams in the channel, wherein the interpolation processing module is configured to receive respective receive parameters from the parameter load bus, time multiplexed delayed beam data, and interpolation coefficient selection parameters, and to generate interpolated beam data, and wherein the apodization module is configured to receive respective receive parameters from the parameter load bus and the interpolated beam data and to generate apodized beam data.

2. The time multiplexed device for beamforming of claim 1, wherein the parameter distributing and synchronizing unit comprises:

a parameter memory for storing various receive parameters relating to a probe; and a parameter controller for distributing and synchronizing respective receive parameters of each beam to the echo data write/read unit and the multi-beam processing unit.

3. The time multiplexed device for beamforming of claim 2, wherein the receive parameters are stored in the parameter memory in a multi-level storage structure.

4. The time multiplexed device for beamforming of claim 3, wherein the layers in the multi-level storage structure are selected from one or more of the group consisting of a frequency layer, focus layer, density layer, line number layer and depth layer.

5. The time multiplexed device for beamforming of claim 2, wherein the parameter memory is a SDRAM.

6. The time multiplexed device for beamforming of claim 2, wherein the receive parameters are delay parameters, dynamic focusing parameters, interpolation parameters or apodization parameters.

7. The time multiplexed device for beamforming of claim 3, wherein the receive parameters are delay parameters, dynamic focusing parameters, interpolation parameters or apodization parameters.

8. The time multiplexed device for beamforming of claim 1, wherein a parameter register connected to the parameter load bus in each channel has a two-level register structure, the structure comprising:

a parameter address decoding module for decoding the address bus of the parameter load bus to produce a decoded output signal;

a level 1 parameter register for storing data from the data bus of the parameter load bus using the decoded output signal as an enable signal; and a level 2 parameter register for providing, as an enable signal of the level 2 parameter register, a synchronous load signal corresponding to the delayed beam data through the parameter load bus.

9. The time multiplexed device for beamforming of claim 2, wherein a parameter register connected to the parameter load bus in each channel has a two-level register structure, the structure comprising:

a parameter address decoding module for decoding the address bus of the parameter load bus to produce a decoded output signal;

a level 1 parameter register for storing data from the data bus of the parameter load bus using the decoded output signal as an enable signal; and a level 2 parameter register for providing, as an enable signal for the level 2 parameter register, a synchronous load signal corresponding to the delayed beam data through the parameter load bus.

10. The time multiplexed device for beamforming of claim 8, wherein the synchronous load signal is produced by the parameter load bus when the delayed beam data is the last data of a dynamic focusing zone.

11. A time multiplexed method for beamforming, the method comprising:

buffering each echo data that are converted from analog to digital in each channel, and reading the written echo data by means of time multiplexing based on the requirement of a beam data processing;

processing the beam data read out from each channel such that the beam data are interpolated and apodized by means of time multiplexing;

summing, by means of time multiplexing, the beam data having been processed to lead to the final beam data;

wherein, writing/reading the echo data and processing the beam data comprise distributing and synchronizing respective receive parameters of corresponding focusing zones for each beam in each channel by means of a parameter load bus, wherein processing the beam data read out from each channel comprises generating interpolated beam data based on received respective receive parameters from the parameter load bus, time multiplexed beam data, and interpolation coefficient selection parameters, and generating apodized beam data based on received respective receive parameters from the parameter load bus and the interpolated beam data.

12. The time multiplexed method for beamforming of claim 11, wherein distributing and synchronizing receive parameters comprises:

storing the receive parameters in an external parameter memory;

reading out the receive parameters of the corresponding focusing zone in each parameter load cycle during beamforming; and distributing and synchronizing parameters of the respective receive parameters for each beam.

13. The time multiplexed method for beamforming of claim 12, wherein the receive parameters are stored in the parameter memory in a multi-level storage structure.

14. The time multiplexed method for beamforming of claim 13, wherein the layers in the multi-level storage structure are selected from one or more of the group consisting of a frequency layer, focus layer, density layer, line number layer and depth layer.

15. The time multiplexed method for beamforming of claim 12, wherein loading parameter comprises:

decoding the address bus of the parameter load bus to generate an enable signal for storing;

storing in a first parameter register the data from the data bus of the parameter load bus according to the enable signal; and updating, when a synchronous load signal is valid, the stored data to a second parameter register for use by a corresponding unit.

16. The time multiplexed method for beamforming of claim 15, wherein the synchronous load signal is generated by the parameter load bus when the delayed beam data is the last data of a dynamic focusing zone.

17. The time multiplexed method for beamforming of claim 12, wherein the receive parameters are delay parameters, dynamic focusing parameters, interpolation parameters or apodization parameters.

18. The time multiplexed method for beamforming of claim 13, wherein the receive parameters are delay parameters, dynamic focusing parameters, interpolation parameters or apodization parameters.

* * * * *